(No Model.)

W. H. WALKER.
GAMBREL STICK.

No. 441,517. Patented Nov. 25, 1890.

Witnesses:
E. P. Ellis,
B. Brockett,

Inventor:
W. H. Walker,
per Lehmann & Pattison,
attys

UNITED STATES PATENT OFFICE.

WILLIAM HENRY WALKER, OF DE GRAFF, ASSIGNOR OF ONE-HALF TO JNO. W. MILLER, OF BELLEFONTAINE, OHIO.

GAMBREL-STICK.

SPECIFICATION forming part of Letters Patent No. 441,517, dated November 25, 1890.

Application filed August 20, 1890. Serial No. 362,548. (No model.)

*To all whom it may concern:*

Be it known that I, WILLIAM HENRY WALKER, of De Graff, in the county of Logan and State of Ohio, have invented certain new and useful Improvements in Gambrel-Sticks; and I do hereby declare the following to be a full, clear, and exact description of the invention, such as will enable others skilled in the art to which it pertains to make and use it, reference being had to the accompanying drawings, which form part of this specification.

My invention relates to an improvement in gambrel-sticks for suspending animals; and it consists in the combination and construction of parts, which will be fully described hereinafter, and pointed out in the claim.

The object of my invention is to produce a gambrel-stick which is adapted to move freely around upon a track or other support provided for it, and thus enable large and heavy animals to be quickly and easily moved from one place to another after having been killed.

Figure 1:
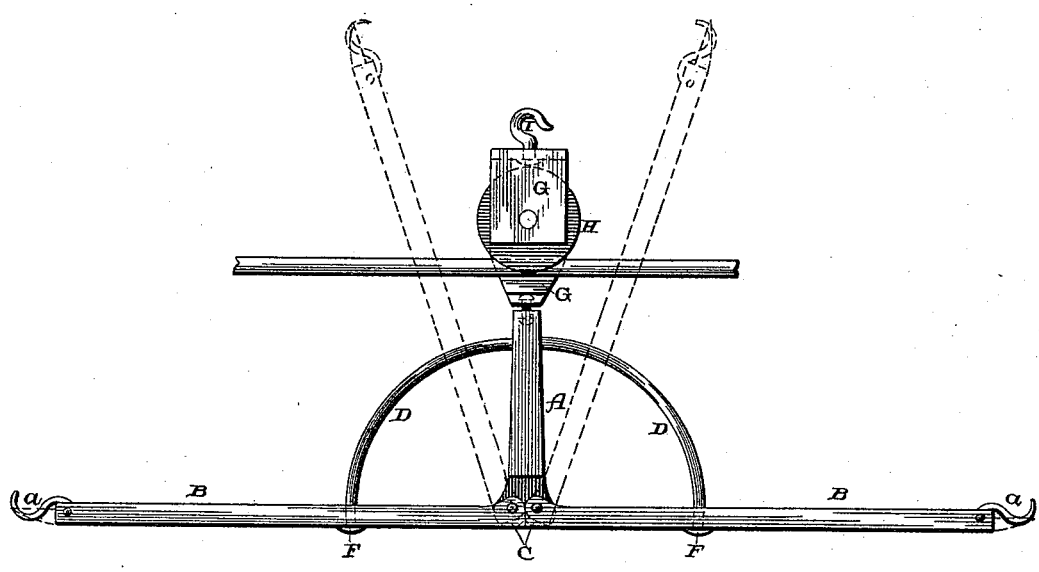
Figure 2:
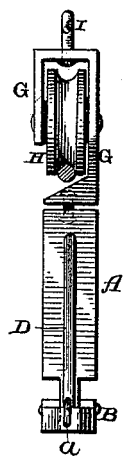

Figure 1 is a side elevation of a device which embodies my invention. Fig. 2 is an edge view of the same.

A represents the supporting-frame, and which may be made of either metal or wood, and to the lower end of which the two arms B are pivoted. The lower ends C of these arms are made angular, as shown, so that when the arms are extended into a horizontal or nearly a horizontal position these ends abut and help to brace the two arms in position, not only for the purpose of preventing their dropping below a certain point, but for the purpose of taking some of the strain from the pivot upon which the arms turn. The lower ends of these arms B are preferably bifurcated so as to straddle over the lower edges of the frame A, which is made thinner at this point for this purpose.

Passing through the frame A is the stay-rod D, which is curved, as shown, and which is provided with a stop F at each end, so as to limit the downward movement of the arms. This rod D serves to prevent any lateral movement of the arms in connection with their bifurcated lower ends, and helps to cause them to move only in straight lines. In case it is not desired to use a curved rod a chain or chains may be substituted therefor and which will answer the same purpose. Upon the upper ends of the arms B, which are suitably shaped or provided with movable hooks *a* for this purpose, the dead animal is suspended.

Swiveled or otherwise loosely connected to the upper end of the frame A is the swiveled pulley-frame G, in which the pulley H is journaled, the frame G being shaped as shown, so as to allow the pulley H to be freely placed upon the track or other support for the purpose of readily and quickly conveying the dead animal from one part of the slaughter-house to another by simply pushing the frame along upon the track. Attached to the upper end of this frame G is a hook I, by means of which the animal can be suspended from any other suitable support than a track. This hook I may be swiveled or rigidly secured to the frame G, as may be desired. If the frame G is swiveled, the hook may be rigidly secured to the frame, or if the hook is swiveled the frame G may be rigidly secured so as to enable the animal to be freely turned in any direction desired.

Having thus described my invention, I claim—

In a gambrel-stick, the combination of a frame having an L-shaped opening at one end, a pulley journaled therein, arms pivoted to its opposite end and having openings, and a circular rod secured to the frame and passing through the said openings in the arms and having a stop on its ends, substantially as shown and described.

In testimony whereof I affix my signature in presence of two witnesses.

WILLIAM HENRY WALKER.

Witnesses:
C. S. REXER,
E. L. CORY.